United States Patent [19]

Chu et al.

[11] Patent Number: 4,501,831
[45] Date of Patent: Feb. 26, 1985

[54] AQUEOUS COATING COMPOSITIONS AND PROCESS FOR THEIR PREPARATION FROM EPOXY ACIDIC ACRYLIC POLYMER AND POLYFUNCTIONAL AMINE

[76] Inventors: Shaw C. Chu, 68 Riverview Ter., Belle Mead, N.J. 08502; Arthur T. Spencer, 105 Madison Ave., New Providence, N.J. 07974

[21] Appl. No.: 566,081

[22] Filed: Dec. 27, 1983

[51] Int. Cl.$^3$ .................. C08L 63/00; C09D 3/58; C09D 5/02
[52] U.S. Cl. .................. 523/412; 428/418; 523/100; 523/400
[58] Field of Search .................. 523/100, 400, 412; 428/418

[56] References Cited

U.S. PATENT DOCUMENTS

| | | | |
|---|---|---|---|
| 4,147,676 | 4/1979 | Pampouchidis | 528/44 |
| 4,182,831 | 1/1980 | Hicks | 528/120 |
| 4,247,439 | 1/1981 | Matthews et al. | 523/409 |
| 4,302,373 | 11/1981 | Steinmetz | 428/418 |
| 4,325,857 | 4/1982 | Champaneria et al. | 523/412 |

Primary Examiner—Ronald W. Griffin
Attorney, Agent, or Firm—James R. Haller

[57] ABSTRACT

Aqueous compositions suitable for use as sanitary container coatings are prepared by reacting epoxy resin and a carboxyl containing acrylic resin in the presence of a polyfunctional tertiary amine. The compositions made with polyfunctional amine have lower viscosities than those made with monofunctional amine, an advantage in preparing high solid coatings for roll application, for example.

17 Claims, No Drawings

AQUEOUS COATING COMPOSITIONS AND PROCESS FOR THEIR PREPARATION FROM EPOXY ACIDIC ACRYLIC POLYMER AND POLYFUNCTIONAL AMINE

BACKGROUND OF THE INVENTION

A variety of aqueous epoxy resin-acrylic resin coating compositions particularly for sanitary can use are known. For example, reaction products of epoxy resins and carboxyl containing acrylic resins in which the reaction is conducted in the presence of a tertiary amine are described in U.S. Pat. No. 4,247,439 to Matthews and Sommerfield; and U.S. Pat. No. 4,302,373 to Steinmetz; and published European Application Nos. 6334 and 6336 all of which are incorporated herein by reference. In accordance with this invention, the catalyst for the reaction between the epoxy resin and the carboxyl containing acrylic resin is a polyfunctional tertiary amine rather than the prior art monofunctional tertiary amine.

BRIEF DESCRIPTION OF THE INVENTION

Epoxy resins are reacted with a copolymer containing free carboxyl groups in the presence of a polyfunctional tertiary amine catalyst to prepare a product which is substantially free of epoxy groups and contains sufficient carboxyl groups to render the product dispersible in water in the neutralized state. The products are useful as coating compositions which can be cured, preferably with aminoplast or phenoplast, to provide santiary can coatings and the like.

DETAILED DESCRIPTION OF THE INVENTION

The compositions of this invention can, in general, be prepared in the manner described in the several patents and published applications incorporated herein by reference by simply substituting a polyfunctional tertiary amine for the monofunctional tertiary amine which is used in the prior art during the reaction between the epoxy resin and the carboxyl containing polymer. Difunctional tertiary amines are preferred.

A variety of polyfunctional tertiary amines are suitable for use in this invention. It is preferred that the polyfunctional tertiary amine have good water solubility. Otherwise, the nature of this amine is not believed to be particularly critical. Tetramethylene diamine and N, N$^1$ dimethylpiperazine have been found to be suitable for use in this invention and result in lower dispersion viscosity than obtained with monofunctional tertiary amines. Lower viscosity permits more facile application, especially by roller coating methods, of high solids dispersions leading to desirable high film weights. In general, any polyfunctional epoxy resin containing an average of more than one 1,2-epoxy group and having an epoxy equivalent weight of 200 to about 10,000 can be used to prepare the compositions of this invention. Preferably, the epoxy resin is an aromatic polyether polyepoxide.

Aromatic polyether epoxides and particularly diglycidyl ethers, are well known and available in commerce. The usual aromatic polyether backbone of the epoxy resin is based on a bisphenol which defines a pair of phenolic groups joined together through an intervening divalent hydrocarbon. The preferred bisphenol is Bisphenol A. The epoxy resins which are used herein posses hydroxy groups in addition to epoxy groups. The higher the molecular weight of the epoxy resin the more hydroxy groups are present. In addition, when the epoxy resin is partially defunctionalized by reaction with an acid or a phenolic compound, additional hydroxy groups are provided. These hydroxy groups can participate in the final curing reaction.

Another essential component of the compositions of this invention is an addition copolymer of monoethylenically unsaturated monomers comprising at least about 10 weight percent of monoethylenically unsaturated carboxylic acid, based on the total weight of monomers. These copolymers are themselves well known. The balance of the copolymer is preferably non-reactive under the contemplated conditions of polymerizations, prereaction with the epoxy resin, and cure, but small amounts of other reactive monomers may be tolerated. Examples of other suitable reactive monomers are hydroxy monomers such as 2-hydroxy ethyl methacrylate, amide monomers such as acrylamide, and N-methylol monomers such as N-methylol acrylamide.

The non-reactive monomers are, for example, acrylate and methacrylate esters, such as ethyl acrylate, methyl methacrylate or isobutyl methacrylate, styrene, para-methyl styrene, vinyl toluene, vinyl acetate, vinyl chloride, vinylidene chloride, acrylonitrile, and the like. Their function is to enhance solvent solubility and film formation.

The carboxyl-functional monomer must be present in the addition copolymer in a relatively high amount so that the final polymer reaction with the epoxy resin will contain the requisite carboxyl groups. The preferred minimum proportion of carboxyl monomer is 10 weight percent of the weight of the monomers. Methacrylic acid provides the best hydrolytic stability and is very much preferred, but other acids are also useful, such as fumaric acid, acrylic acid, crotonic acid, itaconic acid, and the like.

Molecular weight can be controlled by monomer content during polymerization or catalyst concentration, or polymerization temperature, these being known expedients for this purpose. Mercaptan chain termination is preferably avoided when sanitary can use is contemplated as mercaptans have an offensive odor.

The proportions of epoxy resin and acidic addition copolymer are such that the ratio of oxirane groups in the epoxy resin to the carboxyl groups in the addition copolymer is from 0.5:1 to 0.05:1, preferably 0.25:1 to 0.1:1. The reaction is conducted until the acid number of the product is between about 35 and 75 mg. KOH/g, preferably 50 to 60 mg. KOH/g.

The epoxy-acrylic resins of this invention are typically prepared in a volatile organic solvent. A wide variety of solvents are suitable. In general, any solvent which does not interfere with the achievement of an emulsion when the acidic copolymer salts are diluted with water can be used. The point at which an emulsion is achieved is easily observed. It occurs when the aqueous system changes from clear to milky.

Organic solvents of limited water miscibility, such as xylene, toluene, and butanol are useful, and they may be used alone or together with water miscible solvents, such as 2-ethoxy ethanol or methyl ethyl ketone.

The compositions of this invention form films with reasonably good properties on baking in the absence of any external curing agent. However, from 1–25 weight percent of the curing agents such as aminoplast resins, phenoplast resins and mixtures thereof will serve to enhance the cure. With analogous prior art polymers at least 15 weight percent of curing agent, based on the total weight of polymer is normally required. While such levels of curing agents are useful with the hydroxy ester copolymers of this inventions, this invention is unusual in enabling the achievement of a superior cure using a smaller proportion of curing agent. For example, 2-12 weight percent is entirely sufficient to cure films containing the hydroxy ester copolymers of this invention. The advantage is using reduced amounts of curing resin is that the small proportion of curing agent needed to provide the desired solvent insolubility results in less brittleness in the cured film.

The preferred curing agents are water dispersible. These will be illustrated by hexamethoxy methyl melamine, or by A stage phenol-formaldehyde resols. However, the compositions of this invention are emulsions and water dispersibility in the curing agent is not essential.

The curing of compositions containing curing agent by baking, is entirely conventional in the art. Presumably, the methylol groups introduced by the curing agent react with the hydroxy and carboxyl groups present in the copolymer, and with the hydroxy present in the aromatic polyether devoid of oxirane functionality. Acidic curing agents are commonly employed to facilitate the cure, though this is not especially when a phenoplast curing agent is used.

In the preferred use of the compositions of this invention from about 3 to about 10 weight percent of water dispersible aminoplast resin is added to the mixture to assist in cure on baking.

The aqueous coating compositions of this invention are primarily useful for coating aluminum, tinplated steel, pretreated metals, steel, or metals coated with the same or different resin compositions, i.e., a second coat. These aqueous compositions also can be used for coating other substrates, such as wood. The most preferred and advantageous use of the coating compositions is metal primers containing large amounts of pigments, e.g. 1 to 60 weight percent. Such compositions contain enough amine for salt formation with from 50 to 90 percent of the available carboxyl groups and enough water to provide a final solids content of about 10 to about 50 weight percent. The pH of these compositions is generally 6-9, preferably 7-8.

The invention is illustrated by the following non-limiting example in which all parts are by weight, unless otherwise specified.

EXAMPLE 1

(a) The acrylic prepolymer is prepared as follows:

|  | Parts by Weight |
| --- | --- |
| n-Butanol | 3942.0 |
| Methacrylic acid | 1714.0 |
| Styrene | 855.4 |
| Ethyl Acrylate | 285.4 |
| Benzoyl Peroxide (70%) | 204.2 |
| 2-Butoxyethanol | 1167.0 |
| n-Butanol | 397.0 |
|  | 8565.0 |

The butanol is charged to a 12-liter reactor equipped with a stirrer, reflux condenser, thermometer, additional funnel and nitrogen inlet. A premix is made of the monomers and the initiator, and 20% is added to the reactor. The reaction mixture is heated to 93° C. under nitrogen blanket and heated at 91°–95° C. for 15 minutes. The remaining premix is added uniformly over 5 hours at this temperature. After the premix slow feed is completed, the reaction is held at 91°–95° C. for two hours. The letdown solvents are then added to dilute the solution viscosity. The resulting product has a solids content of 32.8%, an acid number of 400 and a reduced specific viscosity of 0.21 dl/g in dimethylformamide (DMF).

(b) A master batch mixture of a bisphenol A based diepoxide and the acrylic prepolymer is prepared as follows:

|  | Parts by Weight |
| --- | --- |
| DER 331[1] | 2796.0 |
| Disphenol A | 1496.0 |
| 2-Butoxy ethanol | 467.6 |
| n-Tributylamine | 9.0 |
| Acrylic prepolymer | 4597.0 |
|  | 9365.6 |

[1]DER 331 - Diglycidyl ether of bisphenol A having an epoxy equivalent weight of 182-190.

The first four items are charged to a 12-liter reactor and heated to 130° C. under a nitrogen blanket. The reaction is allowed to exotherm to 170° C. and then maintained at 150° C. until the oxirane content of the reaction adduct decreases to 0.36 meq/g while the molecular weight advances to a reduced specific viscosity of 0.20 dl/g in DMF. The acrylic polymer is then added and well mixed with the epoxy resin until uniform. This epoxy/acrylic mixture has a solid content of 63.9% and an acid number of 100.

(c) The epoxy and acrylic mixture is reacted in the presence of a difunctional amine as follows:

|  | Parts by Weight |
| --- | --- |
| Epoxy/acrylic mixture (from b) | 800.0 |
| Tetramethylethylenediamine | 15.4 |
| N, N—Dimethylaminoethanol | 9.82 |
| Cymel 1156[1] | 24.8 |
| De-ionized water | 746.5 |
|  | 1596.52 |

[1]Cymel 1156 (American Cyanamid Co.) - A butylated melamine curing agent.

The epoxy/acrylic mixture is charged to a 2-liter reactor and heated to 93°–97° C. under nitrogen blanket. The difunctional amine is then added. The acid number of the reaction mixture decreases to 85.5 after two hours and to 82.6 after three hours at this temperature. The decrease in acid number from 100 to 82.6 indicates an essentially complete reaction of the dispoxide with the carboxylic acid functionality in the acrylic prepolymer. This resin product has a solids content of 63.4%, acid number of 82.6 and reduced specific viscosity in DMF of 0.33 dl/g.

To form water reducible coating emulsions, the epoxy acrylic adduct is further neutralized with dimethylaminoethanol and the curing agent, which is optional, is added and then dispersed slowly into the water under good agitation. The emulsion product has a solids content of 32.5% pH of 6.8, viscosity of 173 cps and particle size of 0.30 micron.

EXAMPLE 2

Similar to Example 1(c), except tetramethylethylenediamine is replaced by N, N'-dimethylpiperazine on the same equivalent basis.

|  | Parts by Weight |
| --- | --- |
| Epoxy acrylic mixture (from Ib) | 800.0 |
| N, N'—dimethylpiperazine | 15.1 |
| N, N'—dimethylaminoethanol | 9.82 |
| Cymel 1156 | 24.8 |
| De-ionized Water | 745.5 |

Similar to Example 1(c), the acid number of the epoxy/acrylic mixture in the presence of dimethylpiperazine decreases to 82.5 after two hours, and to 81.4 after three hours at 95° C.

The resin intermediate has a solids content of 63.4, an acid number of 81.4 and a RSV of 0.32.

After emulsification into water, the dispersion product has a solids content of 32.8, pH of 6.8, viscosity of 255 cps and particle size of 0.36 micron.

COMPARATIVE EXAMPLE

This example is prepared just as Example 1(c), except the difunctional amine is replaced by a monofunctional amine on the same equivalent basis.

|  | Parts by Weight |
| --- | --- |
| Epoxy acrylic mixture (from Ib) | 800.0 |
| N, N—dimethylaminoethanol | 23.6 |
| N, N—dimethylaminoethanol | 9.82 |
| Cymel 1156 | 24.8 |
| De-ionized water | 746.5 |

Similar to Example 1(c), the acid number of the epoxy/acrylic mixture in the presence of dimethylaminoethanol decreases to 81.9 after two hours and to 81.7 after three hours at 95° C. The resin intermediate has a solids content of 64.3, an acid number of 81.7, and a RSV of 0.29.

After emulsification, the dispersion product has solids content of 32.9, pH of 6.9, viscosity of 13900 cps and particle size of 0.18 micron.

The dispersion products of Example 1(c) Example 2 and the Comparative Example show significant differences in viscosity which is dependent upon whether difunctional amine or monofunctional amine is used as a catalyst. The viscosity and other physical properties of Example 1(c), Example 2, and the Comparative Example are compared in the following Table.

TABLE

| Amine Type | Example 1(c) Difunctional | Example 2 Difunctional | Comparative Example Monofunctional |
| --- | --- | --- | --- |
| Resin Intermediate |  |  |  |
| % NV | 63.4 | 63.6 | 64.3 |
| Acid Number | 82.6 | 81.4 | 81.7 |
| RSV (DMF) | 0.33 | 0.32 | 0.29 |
| Dispersion Product |  |  |  |
| % NV | 32.5 | 32.8 | 32.9 |
| pH | 6.8 | 6.8 | 6.9 |
| Viscosity | 173 | 255 | 13900 |
| Acid Number | 81.4 | 80.7 | 81.8 |
| Meq. Base | 0.734 | 0.721 | 0.727 |
| % Neutralization | 50.6 | 50.1 | 49.9 |
| Particle size, | 0.30 | 0.36 | 0.18 |

Although the present invention has been described with preferred embodiments, it is to be understood that modifications and variations can be resorted to without departing from the spirit and scope of this invention as those skilled in the art will readily understand. Such variations and modifications are considered to be within the purview and scope of the appended claims.

We claim:

1. A non-gelled composition which is self-emulsifiable in water containing copolymer having carboxyl groups and substantially free of oxirane groups, which composition is the reaction product of
   A. an acidic copolymer having an acid number greater than 150 comprising a solution copolymer of monoethylenically unsaturated monomers containing at least about 20% by weight monoethylenically unsaturated carboxylic acid monomer based on the total weight of the monomers; and
   B. an epoxy resin comprising aromatic polyether containing oxirane groups; said epoxy resin comprising at least 20% of the total resin solids and containing sufficient oxirane groups to provide a ratio of oxirane groups to carboxyl groups from 1:2 to 1:20; in which the reaction is conducted in the presence of a poly-tertiary-amine.

2. The composition of claim 1 in which at least a portion of the carboxyl groups in said hydroxy ester copolymer are reacted with base to render the composition self-dispersible in water.

3. The composition of claim 2 which is emulsified in water in the substantial absence of added emulsifying agents.

4. The composition of claim 1 in which said monoethylenically unsaturated carboxylic acid monomer is methacrylic acid.

5. The composition of claim 1 in which said monoethylenically unsaturated monomers other than said monoethylenically unsaturated carboxylic acid are non-reactive with oxirane groups.

6. The composition of claim 1 in which said monoethylenically unsaturated carboxylic acid monomer is present in an amount of from 30% to 80%, based on the total weight of the monomers.

7. The composition of claim 1 in which said aromatic polyether has a number average molecular weight of at least 1500.

8. The composition of claim 1 in which said amine is a ditertiary-amine.

9. The composition of claim 8 in which said ditertiary-amine is tetramethylene diamine or N, N'-dimethylpiperazine.

10. A process of esterifying a solvent-soluble carboxyl-functional polymer with an epoxy resin without gelation which comprises conducting the esterification reaction in organic solvent medium in the presence of a catalytic amount of a polytertiary-amine catalyst and at an elevated temperature sufficient to cause the oxirane groups of said epoxy resin to react with said carboxyl groups until said oxirane groups are substantially entirely consumed; said epoxy resin constituting at least about 20% of the total resin solids content and containing sufficient oxirane groups to provide a ratio of carboxyl groups to oxirane groups of from 2:1 to 20:1.

11. The process of claim 10 in which said epoxy resin has a number average molecular weight of at least 1500.

12. The process of claim 10 in which said carboxyl-functional polymer is a solution copolymer of monoethylenically unsaturated monomers comprising at least about 20% of monoethylenically unsaturated carboxylic acid, based on the total weight of monomers.

13. The process of claim 12 in which said monoethylenically unsaturated carboxylic acid is methacrylic acid.

14. The process of claim 12 in which said monoethylenically unsaturated monomers other than said monoethylenically unsaturated carboxylic acid are nonreactive with glycidyl ether groups.

15. The process of claim 12 in which said monoethylenically unsaturated carboxylic acid is present in an amount of from 30% to 80%, based on the total weight of the monomers.

16. The process of claim 10 in which said amine is a ditertiary-amine.

17. The process of claim 16 in which said ditertiary-amine is tetramethylene diamine or N, N'-dimethylpiperazine.

* * * * *